United States Patent
Saka (10) Patent No.: US 11,205,780 B2
(45) Date of Patent: Dec. 21, 2021

(54) BATTERY ASSEMBLY AND METHOD OF MANUFACTURING NONAQUEOUS ELECTROLYTE SECONDARY BATTERY

(71) Applicant: TOYOTA JIDOSHA KABUSHIKI KAISHA, Toyota (JP)

(72) Inventor: Hideyuki Saka, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/243,665

(22) Filed: Apr. 29, 2021

(65) Prior Publication Data

US 2021/0249661 A1  Aug. 12, 2021

Related U.S. Application Data

(62) Division of application No. 16/397,614, filed on Apr. 29, 2019.

(30) Foreign Application Priority Data

May 1, 2018  (JP) .............................. JP2018-088128

(51) Int. Cl.
  *H01M 4/04*  (2006.01)
  *H01M 4/62*  (2006.01)
  (Continued)

(52) U.S. Cl.
  CPC ......... *H01M 4/628* (2013.01); *H01M 4/0447* (2013.01); *H01M 4/62* (2013.01);
  (Continued)

(58) Field of Classification Search
  CPC . H01M 4/0447; H01M 4/62; H01M 2004/028
  See application file for complete search history.

(56) References Cited

U.S. PATENT DOCUMENTS

| 8,945,768 B2 | 2/2015 | Nagai |
| 9,722,249 B2 | 8/2017 | Lovenich et al. |
| (Continued) | | |

FOREIGN PATENT DOCUMENTS

| JP | 2016-126908 A | 7/2016 |
| JP | 2016126909 A | 7/2016 |
| JP | 2016143454 A | 8/2016 |

*Primary Examiner* — Amanda C. Walke
(74) *Attorney, Agent, or Firm* — Sughrue Mion, PLLC (57) ABSTRACT

A battery assembly disclosed herein is a battery assembly before being subjected to initial charge. In the battery assembly, a positive electrode has a positive electrode mixture layer that contains a positive electrode active material and NMP, and an oxalate complex compound and $FSO_3Li$ are contained in a nonaqueous electrolyte solution. In the battery assembly disclosed herein, a NMP content in the positive electrode mixture layer is 50 ppm to 1500 ppm, the DBP oil absorption of the positive electrode active material is 30 ml/100 g to 45 ml/100 g, and a $FSO_3Li$ content in the nonaqueous electrolyte solution is 0.1 wt % to 1.0 wt %. With this, it is possible to prevent a reduction in input-output characteristics caused by formation of a film derived from NMP on the surface of the positive electrode active material, and hence it is possible to prevent an increase in facility cost and a reduction in manufacturing efficiency caused by adjustment of the content of NMP.

2 Claims, 3 Drawing Sheets

(51) Int. Cl.
*H01M 10/0567* (2010.01)
*H01M 10/44* (2006.01)
*H01M 4/02* (2006.01)

(52) U.S. Cl.
CPC ..... *H01M 10/0567* (2013.01); *H01M 10/446* (2013.01); *H01M 2004/028* (2013.01)

(56) References Cited

U.S. PATENT DOCUMENTS

| | | |
|---|---|---|
| 10,218,035 B2 | 2/2019 | Takahata |
| 10,693,122 B2 | 6/2020 | Kim |
| 2016/0190595 A1 | 6/2016 | Takahata |
| 2016/0226106 A1 | 8/2016 | Minami et al. |
| 2017/0358800 A1 | 12/2017 | Sun et al. |
| 2018/0026314 A1 | 1/2018 | Takahata |

BATTERY ASSEMBLY AND METHOD OF MANUFACTURING NONAQUEOUS ELECTROLYTE SECONDARY BATTERY

CROSS REFERENCE TO RELATED APPLICATIONS

The present application is a divisional of U.S. patent application Ser. No. 16/397,614, filed Apr. 29, 20219, which claims priority based on Japanese Patent Application No. 2018-088128, filed on May 1, 2018, the disclosures of which are incorporated herein by reference in their respective entireties.

BACKGROUND

1. Technical Field

The present disclosure relates to a battery assembly before being subjected to initial charge, and a method of manufacturing a nonaqueous electrolyte secondary battery by performing the initial charge on the battery assembly.

2. Description of the Related Art

In recent years, a nonaqueous electrolyte secondary battery such as a lithium ion secondary battery is preferably used as what is called a portable power source for a personal computer or a cellular phone, or a power source for driving a vehicle. Among such nonaqueous electrolyte secondary batteries, the importance of a lithium ion secondary battery that is light and capable of obtaining high energy density is particularly increased. The lithium ion secondary battery is used as a high output power source used in a vehicle such as an electric vehicle or a hybrid vehicle (e.g., a power source for driving a motor coupled to a driving wheel of a vehicle).

In general, such a nonaqueous electrolyte secondary battery is manufactured by fabricating a battery assembly in which an electrode body and a nonaqueous electrolyte solution are accommodated in a case, and performing initial charge on the battery assembly. The electrode body includes a sheet-shaped positive electrode in which a positive electrode mixture layer is provided on the surface of a foil-like positive electrode current collector, and a sheet-shaped negative electrode in which a negative electrode mixture layer is provided on the surface of a foil-like negative electrode current collector.

In the manufacture of such a nonaqueous electrolyte secondary battery, there are cases where part of the nonaqueous electrolyte solution (hereinafter also simply referred to as an "electrolyte solution") resolves in the initial charge, and a film called a solid electrolyte interface (SEI) film is formed on the surface of a negative electrode active material. When such an SEI film is formed, the negative electrode is stabilized, and hence the subsequent resolution of the electrolyte resolution is inhibited.

However, the resolution of the electrolyte solution in the initial charge described above is an irreversible reaction, and hence the resolution thereof leads to a reduction in battery capacity. To cope with this, in recent years, there is proposed a technique in which an additive (hereinafter referred to as a "film-forming agent") that resolves at a potential lower than the resolution potential of the electrolyte solution and forms the SEI film is added to the electrolyte solution in advance and a film derived from the film-forming agent is thereby formed.

An example of the technique for forming the film derived from such a film-forming agent includes a technique described in Japanese Patent Application Publication No. 2016-126908. In the technique described in the document, an oxalate complex compound serving as the film-forming agent is added to a nonaqueous electrolyte solution, and N-methyl-2-pyrrolidone (hereinafter also referred to as "NMP") is added to a positive electrode active material layer (positive electrode mixture layer). With this, it is possible to form a film (SEI film) that contains an ingredient derived from NMP and an ingredient derived from the oxalate complex compound on the surface of an active material (typically, a negative electrode active material). By forming the SEI film derived from NMP and the oxalate complex compound, it is possible to obtain a battery that is excellent in durability (e.g., high temperature retention characteristics) as compared with the case where the SEI film derived only from the oxalate complex compound is formed.

SUMMARY

Incidentally, in one of means for forming the positive electrode mixture layer containing NMP such as the technique described in Japanese Patent Application Publication No. 2016-126908, NMP is used as a dispersion medium that is used when a precursor of the positive electrode mixture layer (positive electrode mixture paste) is prepared. However, in the means, when a NMP content in the positive electrode mixture layer (residual NMP amount) is excessively high, there is a possibility that a high-resistance film will be formed on the surface of a positive electrode active material, and input-output characteristics will be reduced. To cope with this, in the conventional technique, the residual NMP amount in the positive electrode mixture layer is adjusted by performing a heating and drying process on the positive electrode mixture paste applied to the surface of the positive electrode current collector and removing part of NMP.

However, in the conventional technique described above, in order to reliably adjust the residual NMP amount in the positive electrode mixture layer to an amount that does not cause a reduction in input-output characteristics, it is necessary to perform the heating and drying process for a long time. Accordingly, problems such as an increase in facility cost caused by extension of a heating and drying line at a manufacturing site, and a reduction in manufacturing efficiency caused by prolonged process time have occurred.

The present disclosure has been made in order to cope with such problems, and an object thereof is to provide a technique for efficiently manufacturing a nonaqueous electrolyte secondary battery in which a film containing an ingredient derived from NMP is formed on the surface of a negative electrode active material at low cost.

In order to achieve the above object, a battery assembly having the following configuration is provided as an aspect of the present disclosure.

Note that, as described above, the nonaqueous electrolyte secondary battery is manufactured by performing initial charge (conditioning process) on a structure in which an electrode body and a nonaqueous electrolyte solution are accommodated in a case. The "battery assembly" in the present specification denotes the structure before being subjected to the initial charge.

A battery assembly disclosed herein includes an electrode body having a positive electrode and a negative electrode, a nonaqueous electrolyte solution containing a nonaqueous solvent and a supporting electrolyte, and a case accommodating the electrode body and the nonaqueous electrolyte solution. In the battery assembly, the positive electrode has a positive electrode mixture layer that contains a granular positive electrode active material and N-methyl-2-pyrrolidone, and an oxalate complex compound and lithium fluorosulfonate ($FSO_3Li$) are contained in the nonaqueous electrolyte solution.

In addition, in the battery assembly disclosed herein, the content of N-methyl-2-pyrrolidone per unit mass of the positive electrode mixture layer is 50 ppm to 1500 ppm, the DBP oil absorption of the positive electrode active material is 30 ml/100 g to 45 ml/100 g, and the content of lithium fluorosulfonate is 0.1 wt % to 1.0 wt % when the total mass of the nonaqueous electrolyte solution is 100 wt %.

Note that the "DBP oil absorption" in the present specification denotes a value measured based on JIS K6217-4 (2008) with dibutyl phthalate (DBP) used as a reagent liquid. In addition, the "content of NMP" in the present specification denotes the amount of NMP remaining in the positive electrode mixture layer of the battery assembly before subjected to the initial charge (residual NMP amount), i.e., the NMP content after being adjusted by a heating and drying process or the like unless otherwise explicitly specified.

First, in the battery assembly disclosed herein, $FSO_3Li$ is contained in the nonaqueous electrolyte solution. The $FSO_3Li$ has the function of resolving in the initial charge and causing an ingredient derived from the $FSO_3Li$ to be absorbed on the surface of the positive electrode active material and form a film.

The present inventors have focused attention on the fact that the resolution and absorption of the $FSO_3Li$ take place before the resolution of NMP, and the fact that the resistance of a film derived from $FSO_3Li$ is lower than that of a film derived from NMP. That is, the present inventors have concluded that the low-resistance film derived from $FSO_3Li$ is formed on the surface of the positive electrode active material before the high-resistance film derived from NMP is formed on the surface of the positive electrode active material by using the nonaqueous electrolyte solution containing $FSO_3Li$, and hence it is possible to prevent a reduction in output characteristic caused by the formation of the film derived from NMP on the surface of the positive electrode active material.

In general, it is considered that, when the DBP oil absorption of the positive electrode active material is increased, the number of reaction fields in charge and discharge is increased, and hence input-output characteristics of a battery are improved. However, when the DBP oil absorption of the positive electrode active material is excessively high in the case where the film derived from $FSO_3Li$ is formed on the surface of the positive electrode active material, the number of reaction fields in charge and discharge is excessively increased, and there is a possibility that the formation of the high-resistance film derived from NMP will start before the film derived from $FSO_3Li$ properly covers the reaction fields. The present inventors have concluded that, in consideration of the above possibility, it is necessary to adjust the DBP oil absorption of the positive electrode active material to a predetermined range in order to properly form the film derived from $FSO_3Li$ and obtain preferable input-output characteristics.

The battery assembly disclosed herein has been obtained by performing various tests by the present inventors based on the above knowledge. That is, in the battery assembly disclosed herein, the DBP oil absorption of the positive electrode active material is adjusted to 30 ml/100 g to 45 ml/100 g, and the content of $FSO_3Li$ in the nonaqueous electrolyte solution is adjusted to 0.1 wt % to 1.0 wt %. With this, it is possible to preferentially form the low-resistance film derived from $FSO_3Li$ on the surface of the positive electrode active material, and suitably prevent a large amount of the high-resistance film derived from NMP from being formed on the surface of the positive electrode active material.

Consequently, according to the battery assembly disclosed herein, even when the residual NMP amount in the positive electrode mixture layer is increased, it is possible to prevent a reduction in input-output characteristics caused by the formation of the film derived from NMP (in other words, it is possible to increase the permissible amount of the residual NMP amount to an amount larger than the conventional permissible amount thereof). Specifically, according to the battery assembly disclosed herein, it is possible to increase the permissible amount of the residual NMP to 1500 ppm. As a result, it is possible to reduce time required for the heating and drying process required to remove NMP, and hence it is possible to significantly contribute to a reduction in facility cost and an improvement in manufacturing efficiency in the manufacture of the nonaqueous electrolyte secondary battery.

Note that, in the battery assembly disclosed herein, at least a specific amount of NMP needs to be contained in the positive electrode mixture layer for the initial purpose of improving the durability of the battery. In order to enable the improvement in the durability, it is required that the content of NMP in the positive electrode mixture layer is 50 ppm or more.

In a preferred aspect of the battery assembly disclosed herein, the content of the oxalate complex compound is 0.05 wt % to 1.0 wt % when the total mass of the nonaqueous electrolyte solution is 100 wt %.

With this, when the initial charge is performed on the battery assembly, it is possible to suitably form an SEI film on the surface of an active material (typically, a negative electrode active material), and hence it is possible to suitably prevent a reduction in battery capacity caused by the resolution of the electrolyte solution.

In addition, as another aspect of the present disclosure, a method of manufacturing a nonaqueous electrolyte secondary battery having the following configuration is provided.

The method of manufacturing the nonaqueous electrolyte secondary battery disclosed herein is the method of manufacturing the nonaqueous electrolyte secondary battery including an electrode body having a positive electrode and a negative electrode, a nonaqueous electrolyte solution containing a nonaqueous solvent and a supporting electrolyte, and a case accommodating the electrode body and the nonaqueous electrolyte solution.

The manufacturing method includes the steps of: preparing the positive electrode having a positive electrode mixture layer that contains a granular positive electrode active material and N-methyl-2-pyrrolidone; preparing the nonaqueous electrolyte solution that contains an oxalate complex compound and lithium fluorosulfonate ($FSO_3Li$); accommodating the electrode body and the nonaqueous electrolyte solution in the case to fabricate a battery assembly; and manufacturing the nonaqueous electrolyte secondary battery by performing initial charge on the battery assembly.

In addition, in the manufacturing method disclosed herein, the content of N-methyl-2-pyrrolidone per unit mass of the positive electrode mixture layer is 50 ppm to 1500 ppm, the DBP oil absorption of the positive electrode active material is 30 ml/100 g to 45 ml/100 g, and the content of lithium fluorosulfonate is 0.1 wt % to 1.0 wt % when the total mass of the nonaqueous electrolyte solution is 100 wt %.

The manufacturing method disclosed herein manufactures the nonaqueous electrolyte secondary battery by performing the initial charge on the battery assembly of the above aspect. As described above, in the battery assembly of the above aspect, $FSO_3Li$ is contained in the nonaqueous electrolyte solution, and the content of $FSO_3Li$ in the nonaqueous electrolyte solution and the DBP oil absorption of the positive electrode active material are set so as to fall within predetermined ranges. Consequently, by performing the initial charge on the battery assembly, it is possible to preferentially form the low-resistance film derived from $FSO_3Li$ on the surface of the positive electrode active material, and prevent the formation of the high-resistance film derived from NMP on the surface of the positive electrode active material. With this, it is possible to prevent a reduction in input-output characteristics caused by the formation of the film derived from NMP, and hence it is possible to increase the permissible amount of the residual NMP amount in the positive electrode mixture layer to an amount larger than the conventional permissible amount thereof. Consequently, according to the manufacturing method disclosed herein, it is possible to reduce time required for the heating and drying process for the adjustment of the NMP content, and significantly contribute to a reduction in facility cost and an improvement in manufacturing efficiency in the manufacture of the nonaqueous electrolyte secondary battery.

In addition, in a preferred aspect of the method of manufacturing the nonaqueous electrolyte secondary battery disclosed herein, the content of the oxalate complex compound is 0.05 wt % to 1.0 wt % when the total mass of the nonaqueous electrolyte solution is 100 wt %.

With this, it is possible to suitably form the SEI film on the surface of the active material (typically, the negative electrode active material), and hence it is possible to suitably prevent a reduction in battery capacity caused by the resolution of the nonaqueous electrolyte solution.

DETAILED DESCRIPTION

Hereinbelow, embodiments of the present disclosure will be described. In the drawings used in the following description, members and portions that have the same functions are designated by the same reference numerals. Note that the dimensional relationship (length, width, thickness, and the like) in the individual drawings may not necessarily reflect the actual dimensional relationship in an accurate manner. Apart from matters that are specifically mentioned in the present specification, other matters that are necessary for implementing the present disclosure (e.g., structures of a case and an electrode terminal and the like) can be understood as design matters of those skilled in the art based on conventional techniques in the field.

Note that, in the case where a numerical range is indicated by "A to B" in the present specification, "A to B" means "not less than A and not more than B".

1. Battery Assembly

Figure 1:
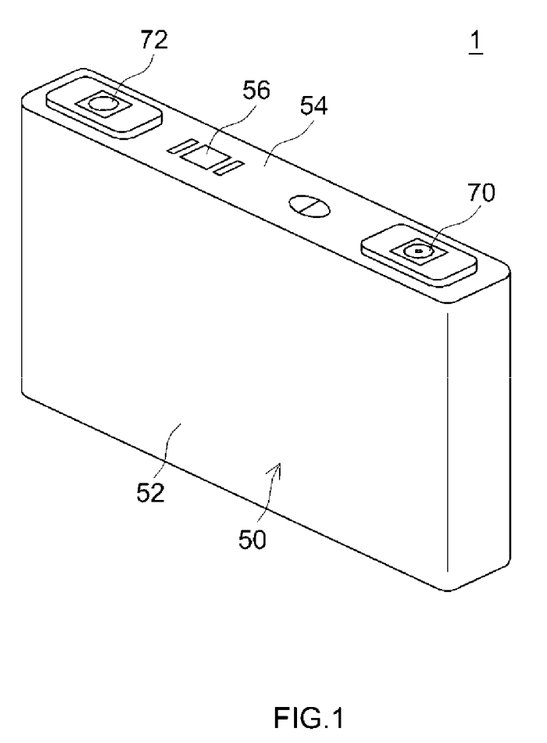
FIG. 1 is a perspective view schematically showing a battery assembly according to an embodiment of the present disclosure.
Figure 2:
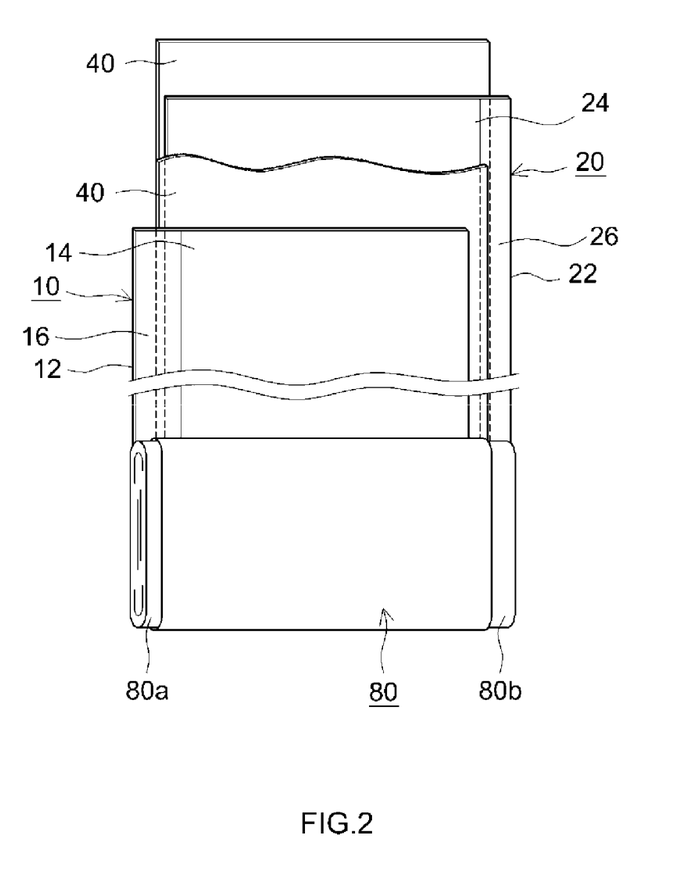
FIG. 2 is a perspective view schematically showing an electrode body in the embodiment of the present disclosure.

Hereinbelow, as an embodiment of the present disclosure, a lithium ion secondary battery before being subjected to initial charge (conditioning process), i.e., a battery assembly of a lithium ion secondary battery will be described. FIG. 1 is a perspective view schematically showing the battery assembly according to the present embodiment, and FIG. 2 is a perspective view schematically showing an electrode body in the present embodiment.

(1) Case

As shown in FIG. 1, a battery assembly 1 according to the present embodiment includes a flat square case 50. The case 50 is constituted by a flat case body 52 of which the upper surface is open, and a lid 54 that covers an opening portion in the upper surface. The lid 54 serving as the upper surface of the case 50 is provided with a positive electrode terminal 70, a negative electrode terminal 72, and a liquid inlet 56.

(2) Electrode Body

In the battery assembly 1 according to the present embodiment, an electrode body 80 shown in FIG. 2 is accommodated inside the case 50. The electrode body 80 includes a positive electrode 10, a negative electrode 20, and a separator 40. The positive electrode 10 and the negative electrode 20 face each other via the separator 40. Specifically, the electrode body 80 is a wound electrode body formed by stacking the positive electrode 10 and the negative electrode 20 in layers via the separator 40 and winding the multilayer body.

Hereinbelow, members constituting the electrode body 80 in the present embodiment will be specifically described.

(a) Positive Electrode

As shown in FIG. 2, the positive electrode 10 is formed by providing a positive electrode mixture layer 14 on the surface (typically, both surfaces) of a positive electrode current collector 12. In addition, at one side edge portion of the positive electrode 10, a current collector exposed portion 16 on which the positive electrode mixture layer 14 is not provided is formed. Further, at one side edge portion of the electrode body 80, a positive electrode connection portion 80a around which the current collector exposed portion 16 is wound is formed, and the positive electrode terminal 70 (see FIG. 1) is connected to the positive electrode connection portion 80a. Note that aluminum foil or the like is used as the positive electrode current collector 12.

(a-1) Positive Electrode Active Material

The positive electrode mixture layer 14 contains a granular positive electrode active material. The positive electrode active material includes a lithium composite oxide that can occlude and release lithium ions. As such a positive electrode active material, a lithium composite oxide containing one or more transition metal elements (lithium-transition metal composite oxide) is used. Examples of the lithium-transition metal composite oxide include a lithium-nickel composite oxide, a lithium-nickel-cobalt composite oxide, and a lithium-nickel-cobalt-manganese composite oxide, and a lithium-nickel-cobalt-manganese composite oxide having a layered rock salt structure is typically used. Note that the type of the lithium composite oxide that can be used as the positive electrode active material in the battery assembly disclosed herein is not particularly limited, and hence the detailed description thereof will be omitted.

In the battery assembly 1 according to the present embodiment, the DBP oil absorption of the positive electrode active material described above is adjusted to a range of 30 ml/100 g to 45 ml/100 g. The range of the DBP oil absorption of the positive electrode active material may be set to 32.5 ml/100 g to 42.5 ml/100 g, and the example of DBP oil absorption thereof is about 40 ml/100 g. Although described later in detail, by adjusting the DBP oil absorption of the positive electrode active material to 30 ml/100 g or more, it is possible to ensure sufficient reaction fields in charge and discharge, and hence it is possible to suitably improve input-output characteristics. On the other hand, when the oil absorption of the positive electrode active material exceeds 45 ml/100 g, the possibility that a film derived from NMP will be formed on the surface of the positive electrode active material and input-output characteristics will be reduced is increased. The positive electrode active material having the above DBP oil absorption can be obtained by using a hollow lithium composite oxide having an internal cavity.

(a-2) N-methyl-2-pyrrolidone

Further, in the battery assembly 1 according to the present embodiment, the positive electrode mixture layer 14 contains N-methyl-2-pyrrolidone (NMP). In the battery assembly 1 according to the present embodiment, the NMP content per unit mass of the positive electrode mixture layer 14 is adjusted to a predetermined range. Although described later specifically, according to the present embodiment, it is possible to prevent the formation of the film derived from NMP on the surface of the positive electrode active material, and hence it is possible to increase the permissible amount of residual NMP to 1500 ppm. On the other hand, from the viewpoint of improving the durability of the battery by forming an SEI film containing an ingredient derived from NMP on the surface of a negative electrode active material, it is necessary to adjust the content of NMP in the positive electrode mixture layer to 50 ppm or more. Consequently, in the battery assembly 1 according to the present embodiment, the NMP content per unit mass of the positive electrode mixture layer 14 is adjusted to 50 ppm to 1500 ppm. The range of the NMP content may be set to 500 ppm to 1000 ppm, and the example of NMP content is 750 ppm.

(a-3) Other Additives

Note that the positive electrode mixture layer 14 may contain an additive other than the above-described positive electrode active material. Examples of the additive include a conductive material and a binder. As the conductive material, it is possible to suitably use, e.g., carbon black such as acetylene black (AB) or a carbon material such as graphite. In addition, as the binder, it is possible to use, e.g., polyvinylidene fluoride (PVdF), polyvinylidene chloride (PVdC), or polyethylene oxide (PEO).

(b) Negative Electrode

As shown in FIG. 2, the negative electrode 20 is formed by providing a negative electrode mixture layer 24 on the surface (e.g., both surfaces) of a negative electrode current collector 22. At one side edge portion of the negative electrode 20, a current collector exposed portion 26 on which the negative electrode mixture layer 24 is not provided is formed. In addition, a negative electrode connection portion 80b around which the current collector exposed portion 26 is wound is formed at one side edge portion of the electrode body 80, and the negative electrode terminal 72 (see FIG. 1) is connected to the negative electrode connection portion 80b. Note that copper foil or the like is used as the negative electrode current collector 22.

(b-1) Negative Electrode Active Material

The negative electrode mixture layer 24 contains a granular negative electrode active material. The negative electrode active material includes a carbon material that can occlude and release lithium ions. As the carbon material used as such a negative electrode active material, it is possible to use one or two or more materials that are conventionally used in the lithium ion secondary battery without particular limitation. As the carbon material, for example, graphite carbon (graphite), amorphous carbon, or amorphous coated graphite is used. Note that the type of the carbon material that can be used as the negative electrode active material in the battery assembly disclosed herein is not particularly limited, and hence the detailed description thereof will be omitted.

(b-2) Other Additives

The negative electrode mixture layer 24 may contain an additive other than the negative electrode active material. Examples of the additive include a binder and a thickening agent. As the binder, it is possible to use, e.g., polyvinylidene fluoride (PVDF) or styrene butadiene rubber (SBR) and, as the thickening agent, it is possible to use, e.g., carboxymethyl cellulose (CMC) or the like.

(c) Separator

The separator 40 is disposed between the positive electrode 10 and the negative electrode 20. The separator 40 is a porous insulating sheet in which a plurality of minute pores that allow passage of charge carriers (lithium ions) are formed. The diameter of the pore of the separator 40 is about 0.01 µm to 6 µm. In the separator 40, it is possible to use insulating resins such as, e.g., polyethylene (PE), polypropylene (PP), polyester, and polyamide. Note that the separator 40 may be a multilayer sheet in which two or more layers of the above resin are stacked. The thickness of the separator 40 may be set to 5 µm to 40 µm, 10 µm to 30 µm, or even 15 µm to 25 µm. On the surface of the separator 40, a heat resistance layer (HRL layer) containing a metal oxide such as alumina ($Al_2O_3$) may be formed.

(3) Nonaqueous Electrolyte Solution

Although not shown in the drawings, in the battery assembly 1 according to the present embodiment, a nonaqueous electrolyte solution in which a supporting electrolyte and a film-forming agent are contained in an organic solvent (nonaqueous solvent) is accommodated inside the case 50 (see FIG. 1). Hereinbelow, the composition of the nonaqueous electrolyte solution in the present embodiment will be described.

(a) Nonaqueous Solvent

As the nonaqueous solvent, it is possible to use, e.g., various organic solvents that are used in the nonaqueous electrolyte solution of a common lithium ion secondary battery without particular limitation. Examples of the organic solvent include saturated cyclic carbonate, chain carbonate, chain carboxylate ester, cyclic carboxylate ester, an ether-based compound, and a sulfone-based compound. In addition, the organic solvents can be used alone or in combination of two or more thereof.

Note that, among the nonaqueous solvents, specific examples of the saturated cyclic carbonate include ethylene carbonate, propylene carbonate, and butylene carbonate. Specific examples of the chain carbonate include dimethyl carbonate, diethyl carbonate, ethyl methyl carbonate, and di-n-propyl carbonate. Specific examples of the chain carboxylate ester include methyl acetate, ethyl acetate, n-propyl acetate, and n-butyl acetate. Specific examples of the cyclic carboxylate ester include gamma-butyrolactone, gamma-valerolactone, gamma-caprolactone, and epsilon-caprolactone. Specific examples of the ether-based compound include diethyl ether, di (2-fluoroethyl) ether, and di (2,2-difluoroethyl) ether. Specific examples of the sulfone-based compound include 2-methylsulfolane, 3-methylsulfolane, 2-fluorosulfolane, and 3-fluorosulfolane.

(b) Supporting Electrolyte

The supporting electrolyte is used as a main electrolyte, and a lithium salt such as, e.g., $LiPF_6$, $LiBF_4$, or $LiClO_4$, is suitably used. The content of the supporting electrolyte is not particularly limited unless the effect of the present disclosure is significantly spoiled. For example, in the case where $LiPF_6$ is used as the supporting electrolyte, the mol concentration of $LiPF_6$ is adjusted to 0.5 mol/L to 3.0 mol/L. The range of the mol concentration of $LiPF_6$ may be set to 0.5 mol/L to 1.5 mol/L, and the example of molarity thereof is 1 mol/L. It is possible to achieve an appropriate balance between the total ion content in the nonaqueous electrolyte solution and the viscosity of the electrolyte solution by adjusting the content of $LiPF_6$ in the nonaqueous electrolyte solution, and hence it is possible to improve input-output characteristics without excessively reducing ion conductivity.

(c) Film-forming Agent

As described above, in the battery assembly 1 according to the present embodiment, the film-forming agent is contained in the nonaqueous electrolyte solution. Specifically, as the film-forming agent, an oxalate complex compound and lithium fluorosulfonate are contained in the nonaqueous electrolyte solution in the present embodiment.

(c-1) Oxalate Complex Compound

The oxalate complex compound is contained in the nonaqueous electrolyte solution in the present embodiment. An example of the oxalate complex compound includes lithium bis (oxalate) borate (LiBOB). The oxalate complex compound is contained in the nonaqueous electrolyte solution, whereby, when initial charge is performed on the battery assembly 1, it is possible to form a negative electrode SEI film 29 (see FIG. 3) containing an ingredient derived from the oxalate complex compound on the surface of a negative electrode active material 28, and prevent a reduction in capacity caused by the resolution of the nonaqueous electrolyte solution.

Figure 3:
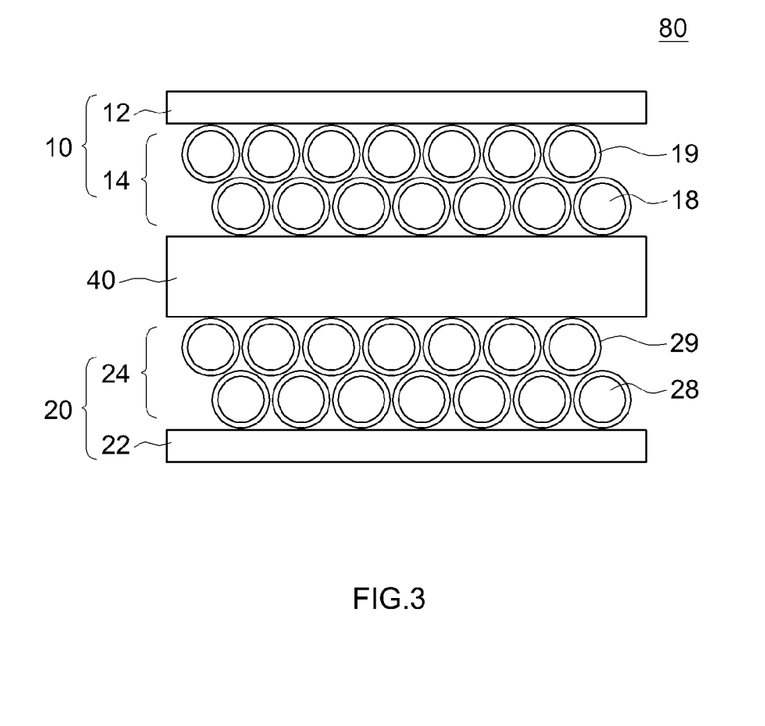
FIG. 3 is a schematic view for explaining positive and negative electrodes of a lithium ion secondary battery according to the embodiment of the present disclosure.

Note that the content of the oxalate complex compound when the total mass of the nonaqueous electrolyte solution is 100 wt % may be adjusted to a range of 0.05 wt % to 1.0 wt %, 0.1 wt % to 0.75 wt %, and may be adjusted to, e.g., 0.5 wt %. With this, when the initial charge is performed on the battery assembly, it is possible to suitably form the negative electrode SEI film 29 on the surface of the negative electrode active material 28, and hence it is possible to suitably prevent a reduction in battery capacity caused by the resolution of the nonaqueous electrolyte solution.

(c-2) Lithium Fluorosulfonate

In addition, as described above, in the battery assembly 1 according to the present embodiment, lithium fluorosulfonate ($FSO_3Li$) is contained in the nonaqueous electrolyte solution. $FSO_3Li$ has the function of being absorbed on the surface of the positive electrode active material and preventing an increase in resistance, and has a characteristic that the speed of resolution and absorption when the initial charge is performed is higher than that of the resolution of NMP. Consequently, as in the present embodiment, $FSO_3Li$ is contained in the nonaqueous electrolyte solution, whereby it is possible to preferentially form a low-resistance film derived from $FSO_3Li$ on the surface of the positive electrode active material before the high-resistance film derived from NMP is formed on the surface of the positive electrode active material, and suitably prevent a reduction in input-output characteristics caused by the formation of the film derived from NMP.

In addition, in the present embodiment, the content of $FSO_3Li$ when the total mass of the nonaqueous electrolyte solution is 100 wt % is set to 0.1 wt % or more. With this, it is possible to properly form the film derived from $FSO_3Li$ on the positive electrode active material, and suitably prevent a reduction in input-output characteristics caused by the formation of the film derived from NMP. Note that the content of $FSO_3Li$ may be set to 0.5 wt % or more.

On the other hand, when the content of $FSO_3Li$ in the nonaqueous electrolyte solution becomes excessively high, there is a possibility that the thickness of the film derived from $FSO_3Li$ formed on the surface of the positive electrode active material will be excessively increased, and the excessive increase can cause a reduction in input-output characteristics. In consideration of this, in the present embodiment, the content of $FSO_3Li$ in the nonaqueous electrolyte solution is adjusted to 1.0 wt % or less. Note that the content of $FSO_3Li$ may be set to 0.75 wt % or less.

2. Method of Manufacturing Lithium Ion Secondary Battery

Next, as another embodiment of the present disclosure, a method of manufacturing the lithium ion secondary battery will be described.

The method of manufacturing the lithium ion secondary battery according to the present embodiment manufactures the lithium ion secondary battery by performing the initial charge on the battery assembly 1 according to the above-described embodiment. Specifically, the manufacturing method according to the present embodiment includes the step of preparing the positive electrode, the step of preparing the nonaqueous electrolyte solution, the step of fabricating the battery assembly, and the step of performing the initial charge on the battery assembly. Hereinafter, each step will be described.

(1) Positive Electrode Preparation Step

In the positive electrode preparation step, the positive electrode having the positive electrode mixture layer containing the granular positive electrode active material and NMP is prepared. Specifically, in the present step, the positive electrode active material having the DBP oil absorption of 30 ml/100 g to 45 ml/100 g is prepared first. Subsequently, a positive electrode mixture paste is prepared by mixing the positive electrode active material and the additive (the conductive material or the binder) and kneading the mixture with a dispersion medium. Then, after the positive electrode mixture paste is applied to the surface of the positive electrode current collector, by performing a heating and drying process and a rolling process on the positive electrode mixture paste, the positive electrode in which the positive electrode mixture layer is provided on the surface of the positive electrode current collector is formed.

In the manufacturing method according to the present embodiment, in the present step, the positive electrode in which NMP having a content of 50 ppm to 1500 ppm is contained in the positive electrode mixture layer is fabricated. In one of the means for forming the positive electrode mixture layer, NMP is used as the dispersion medium that is used when the positive electrode mixture paste is prepared, and conditions of the heating and drying process (temperature and time) are adjusted.

Note that, although a detailed description is omitted, similarly to the common method of manufacturing the lithium ion secondary battery, the method of manufacturing the lithium ion secondary battery according to the present embodiment includes the step of preparing the sheet-shaped negative electrode in which the negative electrode mixture layer is provided on the surface of the negative electrode current collector, and the step of fabricating the electrode body having the positive electrode, the negative electrode, and the separator. These steps can be performed without particularly limiting procedures performed in the conventional method of manufacturing the lithium ion secondary battery, and hence the detailed description thereof will be omitted.

(2) Nonaqueous Electrolyte Solution Preparation Step

In the present step, the nonaqueous electrolyte solution containing the oxalate complex compound and $FSO_3Li$ is prepared. Typically, the nonaqueous electrolyte solution is prepared by dissolving the supporting electrolyte and the film-forming agent (the oxalate complex compound and $FSO_3Li$) in the above-described nonaqueous solvent. At this point, in the manufacturing method according to the present embodiment, the addition amounts of the individual materials are adjusted such that the content of the oxalate complex compound is 0.05 wt % to 1.0 wt % and the content of $FSO_3Li$ is 0.1 wt % to 1.0 wt % relative to the total mass of the nonaqueous electrolyte solution (100 wt %).

(3) Battery Assembly Fabrication Step

In the present step, the battery assembly is fabricated by accommodating the electrode body and the nonaqueous electrolyte solution inside the case. Specifically, first, the electrode body 80 (see FIG. 2) is accommodated inside the case body 52 shown in FIG. 1. Subsequently, the positive electrode terminal 70 provided in the lid 54 and the positive electrode connection portion 80a (see FIG. 2) of the electrode body 80 are electrically connected, and the negative electrode terminal 72 and the negative electrode connection portion 80b are electrically connected. Next, the case 50 is fabricated by covering the opening portion in the upper surface of the case body 52 with the lid 54 and welding the case body 52 and the lid 54 together. Subsequently, the nonaqueous electrolyte solution is injected into the case 50 from the liquid inlet 56 provided in the lid 54, and the liquid inlet 56 is then sealed. With this, the battery assembly 1 in which the electrode body 80 and the nonaqueous electrolyte solution are accommodated inside the case 50 is fabricated.

(4) Initial Charge Step

In the manufacturing method according to the present embodiment, next, the nonaqueous electrolyte secondary battery is manufactured by performing the initial charge (conditioning) on the fabricated battery assembly 1. The conditions of the initial charge are not particularly limited. The initial charge can be performed by performing constant current-constant voltage charge (CC-CV charge) in which the battery assembly 1 is charged until an inter-terminal voltage between the positive electrode terminal 70 and the negative electrode terminal 72 reaches 2.5 V to 4.2 V at a constant current of about 0.1 C to 10 C in a room temperature environment (e.g., 25° C.), and is then charged until state of charge (SOC) reaches about 60% to 100% at a constant voltage. Note that the inter-terminal voltage in the initial charge may be set to 3.0 V to 4.1 V. SOC may be set to about 80% to 100%.

FIG. 3 is a schematic view for explaining the states of the positive and negative electrodes of the lithium ion secondary battery configured by the initial charge.

As shown in FIG. 3, in the electrode body 80 in the present embodiment, the positive electrode 10 and the negative electrode 20 face each other via the separator 40. As explained in the above embodiment, the positive electrode 10 includes the foil-like positive electrode current collector 12, and the positive electrode mixture layer 14 containing the granular positive electrode active material 18. In addition, the negative electrode 20 includes the foil-like negative electrode current collector 22, and the negative electrode mixture layer 24 containing the granular negative electrode active material 28.

In the present embodiment, when the initial charge is performed on the battery assembly, the film (the negative electrode SEI film 29) is formed on the surface of the negative electrode active material 28, and a film (a positive electrode SEI film 19) is formed on the surface of the positive electrode active material 18.

Specifically, in the present embodiment, since the oxalate complex compound (e.g., LiBOB) and NMP are contained in the nonaqueous electrolyte solution, when the initial charge is performed on the battery assembly, the oxalate complex compound and NMP resolve, and the negative electrode SEI film 29 containing the ingredient derived from the oxalate complex compound and the ingredient derived from NMP is formed on the surface of the negative electrode active material 28. Thus, by forming the negative electrode SEI film 29 containing the ingredient derived from the oxalate complex compound and the ingredient derived from NMP, it is possible to improve the durability of the battery (e.g., high temperature retention performance).

Further, in the present embodiment, $FSO_3Li$ is contained in the nonaqueous electrolyte solution. The $FSO_3Li$ resolves before the NMP resolves when the initial charge is performed, and hence the ingredient derived from the $FSO_3Li$ is absorbed on the surface of the positive electrode active material 18 before the ingredient derived from NMP. Consequently, in the present embodiment, the film (the positive electrode SEI film 19) derived from $FSO_3Li$ is preferentially formed on the surface of the positive electrode active material 18, and it is possible to prevent the formation of the film derived from NMP on the surface of the positive electrode active material 18. The resistance of the positive electrode SEI film 19 derived from the $FSO_3Li$ is lower than that of the film derived from NMP, and hence it is possible to suitably prevent a reduction in input-output characteristics caused by using the positive electrode mixture layer 14 containing NMP.

In addition, in the present embodiment, the DBP oil absorption of the positive electrode active material 18 is adjusted to a predetermined range such that the positive electrode SEI film 19 derived from the $FSO_3Li$ is properly formed on the surface of the positive electrode active material 18. In general, when the DBP oil absorption of the positive electrode active material is increased, the number of reaction fields in charge and discharge is increased, which is preferable for an improvement in input-output characteristics. However, as in the present embodiment, in the case where the positive electrode SEI film derived from $FSO_3Li$ is formed, when the DBP oil absorption of the positive electrode active material is excessively increased, it takes a predetermined amount of time to form the film derived from $FSO_3Li$ such that the film covers all of the reaction fields, and there is a possibility that the film derived from NMP will be formed on the surface of the positive electrode active material 18. Accordingly, in the present embodiment, the DBP oil absorption of the positive electrode active material 18 is adjusted to a range of 30 ml/100 g to 45 ml/100 g.

Thus, in the present embodiment, it is possible to preferentially form the film derived from $FSO_3Li$ on the surface of the positive electrode active material, and hence, in spite of the fact that the positive electrode containing NMP is used for improving durability, it is possible to prevent the formation of the film derived from the NMP on the surface of the positive electrode active material. Consequently, according to the present embodiment, even in the case where the residual NMP amount of about 1500 ppm is contained in the positive electrode mixture layer, it is possible to suitably prevent a reduction in input-output characteristics (in other words, it is possible to increase the permissible amount of the residual NMP amount to 1500 ppm). As a result, it is possible to reduce time required for the heating and drying process for removing NMP, and hence it is possible to contribute to a reduction in facility cost and an improvement in manufacturing efficiency in the manufacture of the nonaqueous electrolyte secondary battery. Note that, from the viewpoint of improving the durability of the battery, it is required that a predetermined amount of NMP is contained in the positive electrode mixture layer, and hence the content of NMP in the positive electrode mixture layer is set to 50 ppm or more in the present embodiment.

3. Other Embodiments

Thus, the embodiments of the present disclosure have been described. However, the present disclosure is not limited to the above-described embodiments, and may be appropriately changed on an as needed basis.

For example, while the above embodiment has described, as the means for forming the positive electrode mixture layer containing NMP, the means that uses NMP as the dispersion medium and adjusts the residual NMP amount using the heating and drying process by way of example, the positive electrode preparation step of the present disclosure is not limited to the means. For example, the positive electrode mixture layer that doesn't contain NMP may be formed in advance, and NMP may be added to the positive electrode mixture layer by using means such as spraying. According to the present disclosure, it is possible to increase the permissible amount of the residual NMP amount in the positive electrode mixture layer, and hence, even when a large amount of NMP is added by spraying or the like, it is possible to prevent a reduction in input-output characteristics caused by the formation of the film derived from NMP. Consequently, it is possible to suitably prevent a reduction in manufacturing efficiency caused by manufacturing and abandoning the battery whose input-output characteristics are significantly reduced.

In addition, the above embodiment describes the wound electrode body around which the positive electrode and the negative electrode are wound via the separator as an example of the electrode body. However, it is only required that the electrode body used in the battery assembly disclosed herein includes the positive electrode and the negative electrode, and the electrode body is not limited to the wound electrode body. Another example of the electrode body includes a multilayer electrode body in which a plurality of the positive electrodes and a plurality of the negative electrodes are stacked in layers via the separators.

Test Example

Hereinbelow, a test example related to the present disclosure will be described, and the description of the test example is not intended to limit the present disclosure.

1. Samples 1 to 21

In the present test example, lithium ion secondary batteries of Samples 1 to 21 were fabricated by fabricating 21 types of battery assemblies that differed in the DBP oil absorption of the positive electrode active material (ml/100 g), the residual NMP amount (ppm) in the positive electrode mixture layer, and the content (wt %) of $FSO_3Li$ in the nonaqueous electrolyte solution from each other, and performing the initial charge on the battery assemblies. Hereinbelow, specific fabrication conditions will be described.

(1) Sample 1

In Sample 1, first, the positive electrode active material (the lithium/nickel/cobalt/manganese composite oxide having the layered rock salt structure ($Li_{1+x}Ni_{1/3}Co_{1/3}Mn_{1/3}O_2$)) having the DBP oil absorption based on JIS K6217-4 of 30 mg/100 g was prepared. Subsequently, the above positive electrode active material, the conductive material (acetylene black (AB)), and the binder (polyvinylidene fluoride (PVdF)) were mixed at a ratio of 90:8:2. Next, the positive electrode mixture paste was prepared by kneading the mixture with N-methyl-2-pyrrolidone (NMP). Subsequently, the sheet-shaped positive electrode in which the positive electrode mixture layers were provided on both surfaces of the positive electrode current collector was fabricated by applying the positive electrode mixture paste to both surfaces of the belt-like positive electrode current collector (aluminum foil) and performing the heating and drying process on the positive electrode mixture paste, and then performing the rolling process thereon. Note that, in the present sample, an amount of time for the heating and drying process was adjusted such that the NMP content (the residual NMP amount) in the positive electrode mixture layer was 50 ppm.

Next, in the present test example, granular graphite was used as the negative electrode active material. The negative electrode mixture paste was prepared by mixing the negative electrode active material, the binder (styrene butadiene rubber (SBR)), and the thickening agent (carboxymethyl cellulose (CMC)) at a ratio of 98:1:1, and then kneading the mixture with the dispersion medium (ion-exchanged water). Subsequently, the sheet-shaped negative electrode in which the negative electrode mixture layers were provided on both surfaces of the negative electrode current collector was fabricated by applying the negative electrode mixture paste to both surfaces of the negative electrode current collector (copper foil) and performing the heating and drying process on the negative electrode mixture paste, and then performing the rolling process thereon.

Next, the flat wound electrode body was fabricated by stacking the positive electrode and the negative electrode fabricated in the above manner in layers via the sheet-shaped separator and winding and pressing the multilayer body. Subsequently, the fabricated wound electrode body was connected to the electrode terminals (the positive electrode terminal and the negative electrode terminal) and then accommodated inside the case body, and the case body and the lid were bonded together. Note that the separator used in the present test example is a separator having a three-layer structure (PP/PE/PP) in which a polyethylene (PE) layer is sandwiched between two polypropylene (PP) layers.

Next, a liquid mixture was prepared. In the liquid mixture, the supporting electrolyte ($LiPF_6$) was dissolved at a concentration of about 1 mol/L in the nonaqueous solvent that contained ethylene carbonate (EC), dimethyl carbonate (DMC), and ethyl methyl carbonate (EMC) at a volume ratio of 3:4:3. Subsequently, the nonaqueous electrolyte solution was prepared by dissolving LiBOB and $FSO_3Li$ in the liquid mixture such that the content of the oxalate complex compound (LiBOB) was 0.5 wt %, and the content of lithium fluorosulfonate ($FSO_3Li$) was 0.1 wt % when the prepared nonaqueous electrolyte solution was 100 wt %.

Next, the battery assembly was fabricated by injecting the above nonaqueous electrolyte solution into the case from the liquid inlet and sealing the liquid inlet.

Subsequently, the lithium ion secondary battery for the test was fabricated by performing the initial charge on the battery assembly. Specifically, first, the above battery assembly was disposed in an environment of 25° C. and was charged at a constant current of 1/3 C (CC charge) until the voltage between the positive electrode terminal and the negative electrode terminal reached 4.1 V, and the initial charge was suspended for 10 minutes. Next, the battery assembly was discharged at the constant current of 1/3 C (CC discharge) until the voltage between the positive electrode terminal and the negative electrode terminal reached 3.0 V, and was discharged at a constant voltage (CV discharge) until the total discharge time reached 1.5 hours, and the initial charge was suspended for 10 minutes. Subsequently, initial charge/discharge (conditioning) was performed by repeating the charge/discharge pattern, which corresponded to one cycle, three times (three cycles).

(2) Samples 2 to 21

In each of Samples 2 to 21, as shown in Table 1 described later, the lithium ion secondary battery for the test was fabricated according to the same procedures as those of Sample 1 except that each of the DBP oil absorption of the positive electrode active material, the residual NMP amount in the positive electrode mixture layer, and the content of $FSO_3Li$ in the nonaqueous electrolyte solution varied.

2. Evaluation Test

In the present evaluation test, output characteristics of the lithium ion secondary batteries of Samples 1 to 21 described above were measured according to the following procedures. Note that the measurement result is shown in Table 1.

Procedure 1: The battery is charged by constant current charge of 1 C until SOC reaches 25% from 3.0 V in the room temperature environment (25° C.).

Procedure 2: The battery of which the SOC is adjusted to 25% is left to stand in a constant temperature bath of −30° C. for six hours.

Procedure 3: After Procedure 2, the battery is discharged at a constant watt (W) from the SOC of 25% in a temperature environment of −30° C. At this point, the number of seconds from the start of the discharge until the voltage reaches 2.0 V is measured.

Procedure 4: Procedures 1 to 3 are repeated while the constant watt discharge voltage of Procedure 3 is changed under conditions of 80 W to 200 W. Herein, the constant watt discharge voltage of Procedure 3 is increased so that the constant watt increases 10 W in each execution of Procedures 1 to 3, that is, the constant watt discharge voltage of Procedure 3 is such a voltage that the constant watt becomes 80 W in the first execution of Procedures 1 to 3, the voltage is such a voltage that the constant watt becomes 90 W in the second execution, 100 W in the third execution, and so on. and Procedures 1 to 3 are repeated until the constant watt discharge voltage of Procedure 3 reaches such a voltage that the constant watt becomes 200 W.

Procedure 5: W at two seconds is calculated as the output characteristic from an approximate curve in a plot in which the horizontal axis indicates the number of seconds from the start of the discharge until the voltage reaches 2.0 V that is measured under each of the constant watt conditions in Procedure 4 and the vertical axis indicates W corresponding to the number of seconds.

Procedure 6: The output characteristic of each sample in the case where the output characteristic of the lithium ion secondary battery of Sample 20 is used as a reference (100) is calculated based on the output characteristic obtained in Procedure 5.

TABLE 1

| Sample | DBP oil absorption (mg/100 g) | residual NMP amount (ppm) | $FSO_3Li$ content (wt %) | output characteristic |
|---|---|---|---|---|
| 1 | 30 | 50 | 0.1 | 123 |
| 2 | 30 | 50 | 1 | 127 |
| 3 | 30 | 1500 | 0.1 | 121 |
| 4 | 30 | 1500 | 1 | 126 |
| 5 | 45 | 50 | 0.1 | 132 |
| 6 | 45 | 50 | 1 | 134 |
| 7 | 45 | 1500 | 0.1 | 131 |
| 8 | 45 | 1500 | 1 | 132 |
| 9 | 30 | 750 | 0.1 | 122 |
| 10 | 30 | 1000 | 0.1 | 121 |
| 11 | 30 | 40 | 0 | 88 |
| 12 | 30 | 50 | 0 | 85 |
| 13 | 30 | 1500 | 0 | 72 |
| 14 | 30 | 40 | 0.08 | 92 |
| 15 | 30 | 40 | 1.1 | 95 |
| 16 | 30 | 2000 | 0.08 | 89 |
| 17 | 30 | 2000 | 1.1 | 98 |
| 18 | 26 | 50 | 0.1 | 99 |
| 19 | 26 | 2000 | 0.1 | 86 |
| 20 | 47 | 50 | 1 | 100 |
| 21 | 47 | 2000 | 1 | 89 |

As shown in Table 1, very preferable output characteristics of 120 or more were observed in the lithium ion secondary batteries of Samples 1 to 10. From this, it was found that, in the case where the residual NMP amount in the positive electrode mixture layer was 50 ppm to 1500 ppm, it was possible to prevent a reduction in output characteristic caused by the residual NMP by adjusting the DBP oil absorption of the positive electrode active material to a range of 30 ml/100 g to 45 ml/100 g and adjusting the content of $FSO_3Li$ in the nonaqueous electrolyte solution to 0.1 wt % to 1 wt %. In other words, it was determined that it was possible to increase the permissible amount of the residual NMP in the positive electrode mixture layer to 1500 ppm by adjusting the DBP oil absorption of the positive electrode active material to the range of 30 ml/100 g to 45 ml/100 g and adjusting the content of $FSO_3Li$ in the nonaqueous electrolyte solution to 0.1 wt % to 1 wt %.

Note that, in any of Samples 11 to 13, the output characteristic was significantly lower than those of Samples 1 to 4. Particularly in Sample 11, in spite of the fact that the residual NMP amount was smaller than those of Samples 1 to 4, the output characteristic was lower than those of Samples 1 to 4. From this, it was determined that it was necessary to add $FSO_3Li$ to the nonaqueous electrolyte solution in order to prevent a reduction in output characteristic caused by the residual NMP.

In Sample 14, in spite of the fact that the residual NMP amount was smaller than that of Sample 1, the output characteristic was lower than that of Sample 1. This may be because the $FSO_3Li$ content in the nonaqueous electrolyte solution was excessively low and the film derived from the $FSO_3Li$ was not adequately formed. From this, it was found that it was necessary to adjust the content of $FSO_3Li$ in the nonaqueous electrolyte solution to 0.1 wt % or more in order to prevent a reduction in output characteristic caused by the residual NMP.

In Sample 15, in spite of the fact that the residual NMP amount was smaller than that of Sample 2, the output characteristic was lower than that of Sample 2. This may be because the $FSO_3Li$ content in the nonaqueous electrolyte solution was excessively high, the thickness of the film formed on the surface of the positive electrode active material was increased, and resistance in the positive electrode was increased. From this, it was found that, in the case where $FSO_3Li$ was added to the nonaqueous electrolyte solution, it was necessary to adjust the content of the $FSO_3Li$ to 1 wt % or less.

In Sample 18, in spite of the fact that 0.1 wt % of $FSO_3Li$ was contained in the nonaqueous electrolyte solution, the output characteristic was lower than that of Sample 1. This may be because the number of reaction fields in charge and discharge is reduced when the DBP oil absorption of the positive electrode active material is excessively reduced. From this, it was found that it was necessary to adjust the DBP oil absorption of the positive electrode active material to 30 mg/100 g or more.

On the other hand, in Sample 20, in spite of the fact that 1 wt % of $FSO_3Li$ was contained in the nonaqueous electrolyte solution, the output characteristic was lower than that of Sample 2. This may be because, when the DBP oil absorption of the positive electrode active material was excessively high, the number of reaction fields in charge and discharge became excessively large, and the formation of the film derived from NMP started before the reaction fields were covered with the film derived from $FSO_3Li$. From this, it was found that, in the case where $FSO_3Li$ was added to the nonaqueous electrolyte solution, it was necessary to adjust the DBP oil absorption of the positive electrode active material to 45 mg/100 g or less.

While the present disclosure has been described in detail, the above embodiments are only illustrative, and the disclosure disclosed herein encompasses various changes and modifications to the specific examples described above.

What is claimed is:

1. A method of manufacturing a nonaqueous electrolyte secondary battery including an electrode body having a positive electrode and a negative electrode, a nonaqueous electrolyte solution containing a nonaqueous solvent and a supporting electrolyte, and a case accommodating the electrode body and the nonaqueous electrolyte solution, the method comprising the steps of:
    preparing the positive electrode having a positive electrode mixture layer on a surface of the positive electrode current collector by performing a heating and drying process on a positive electrode mixture paste that contains a granular positive electrode active material and N-methyl-2-pyrrolidone;
    preparing the nonaqueous electrolyte solution that contains an oxalate complex compound and lithium fluorosulfonate ($FSO_3Li$);
    accommodating the electrode body and the nonaqueous electrolyte solution in the case to fabricate a battery assembly; and
    manufacturing the nonaqueous electrolyte secondary battery by performing initial charge on the battery assembly, wherein
    a content of the N-methyl-2-pyrrolidone per unit mass of the positive electrode mixture layer is 50 ppm to 2000 ppm,
    a DBP oil absorption of the positive electrode active material is 30 ml/100 g to 47 ml/100 g, and
    a content of the lithium fluorosulfonate is 0.08 wt % to 1.1 wt % when a total mass of the nonaqueous electrolyte solution is 100 wt %.

2. The method of manufacturing a nonaqueous electrolyte secondary battery according to claim 1, wherein
    a content of the oxalate complex compound is 0.05 wt % to 1.0 wt % when the total mass of the nonaqueous electrolyte solution is 100 wt %.

* * * * *